US012021717B2

(12) United States Patent
Bradley et al.

(10) Patent No.: US 12,021,717 B2
(45) Date of Patent: Jun. 25, 2024

(54) DEVICE CONNECTIVITY MANAGEMENT

(71) Applicant: AT&T Intellectual Property I, L.P., Atlanta, GA (US)

(72) Inventors: Nigel Bradley, Canton, GA (US); Eric Zavesky, Austin, TX (US); James Pratt, Round Rock, TX (US); Ari Craine, Marietta, GA (US); Robert Koch, Peachtree Corners, GA (US)

(73) Assignee: AT&T Intellect al Property I, L.P., Atlanta, GA (US)

( * ) Notice: Subject to any disclaimer, the term of this patent is extended or adjusted under 35 U.S.C. 154(b) by 0 days.

(21) Appl. No.: 17/662,689

(22) Filed: May 10, 2022

(65) Prior Publication Data
US 2023/0370351 A1   Nov. 16, 2023

(51) Int. Cl.
*H04L 43/0811* (2022.01)
*H04L 41/0604* (2022.01)
*H04L 43/0817* (2022.01)
*H04L 43/55* (2022.01)

(52) U.S. Cl.
CPC ...... *H04L 43/0811* (2013.01); *H04L 41/0627* (2013.01); *H04L 43/0817* (2013.01); *H04L 43/55* (2022.05)

(58) Field of Classification Search
CPC .......... H04L 43/0811; H04L 41/0627; H04L 43/0817; H04L 43/55
USPC ...................................................... 709/224
See application file for complete search history.

(56) References Cited

U.S. PATENT DOCUMENTS

| | | | |
|---|---|---|---|
| 2009/0271517 A1* | 10/2009 | Naylor | H04L 69/28 709/227 |
| 2011/0078325 A1* | 3/2011 | Vanover | H04L 63/10 726/26 |
| 2012/0215880 A1* | 8/2012 | Lamba | H04L 67/142 709/217 |
| 2014/0047356 A1* | 2/2014 | Ameller-Van-Baumberghen | H04L 65/403 715/753 |
| 2017/0070406 A1* | 3/2017 | Yanagisawa | H04L 43/0811 |
| 2019/0320476 A1* | 10/2019 | Wang | H04W 28/0268 |
| 2021/0099740 A1* | 4/2021 | Hale | H04N 21/2385 |
| 2021/0400739 A1* | 12/2021 | Nakano | H04W 76/10 |
| 2022/0247823 A1* | 8/2022 | Cunningham | H04L 63/061 |

* cited by examiner

*Primary Examiner* — Meng Vang

(57) ABSTRACT

The disclosed technology is directed towards managing the establishment and maintenance of communication connectivity between a device and service. Condition data can indicate when to initiate a state change of a connection between a device and a server. Current device conditions associated with the device are evaluated to determine whether to initiate a state change, e.g., from a connected state to a paused state, or vice-versa. The connectivity may be managed per connection type, e.g., cellular versus Wi-Fi, and on a per-application basis, e.g., turned on for a social media application, off for mail and messaging applications. Settings can be used to manage connectivity for an application, e.g., sometimes connected, sometimes paused based on information specific to that application. Trends, user practices and schedule data can be used to predict and manage connectivity, as well as to notify the user to take some action.

20 Claims, 11 Drawing Sheets

DEVICE CONNECTIVITY MANAGEMENT

TECHNICAL FIELD

The subject application relates to device communication in general, e.g., to managing the establishing and maintaining of device connectivity for the purpose of communication, and related embodiments.

BACKGROUND

Contemporary users of device such as smartphones, tablets, laptops and other mobile devices are generally connected to networks and the like including via Wi-Fi, cellular, or BLUETOOTH technologies. This consumes significant resources, particularly cellular communications because of the resources cellular consumes.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
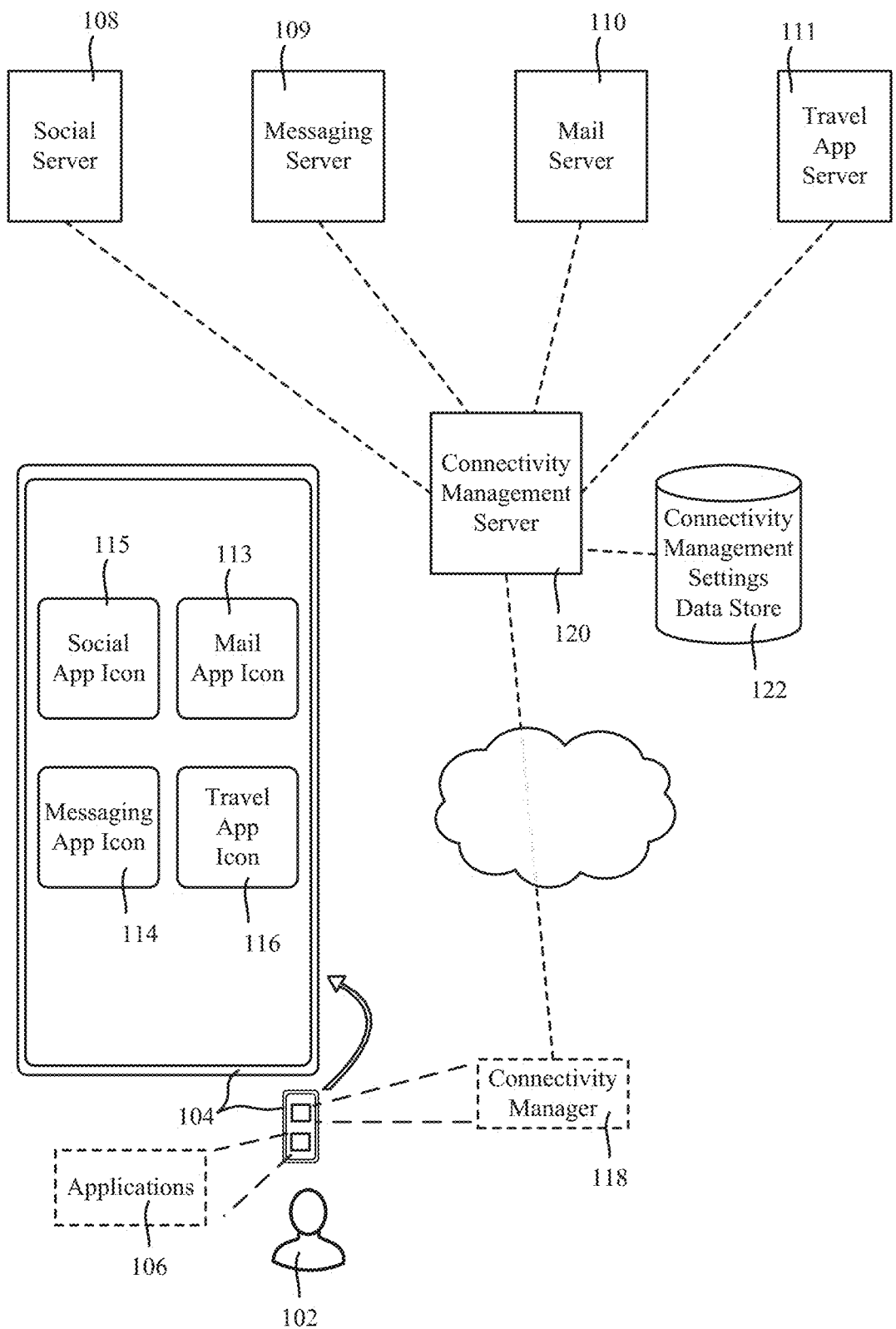
FIG. 1 is a block diagram of an example system that facilitates device connectivity management, in accordance with various aspects and embodiments of the subject disclosure.

The technology described herein is generally directed towards the management of when a user's communication device establishes and maintains connectivity for the purpose of communication. By managing connectivity, including in what is generally a dynamic approach, devices need not be connected pervasively and therefore may be more efficient in terms of their power and/or other resource consumption. Furthermore, by managing connectivity state, including enabling devices to (in general) connect only when needed, a collective benefit is gained by decreasing the aggregate demands on networks, server capacity, and global power consumption demands.

As used in this disclosure, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, can be utilized interchangeably in the application, and can refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user equipment," "device," "communication device," "mobile device," "subscriber," "customer entity," "consumer," "customer entity," "entity" and the like may be employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.11 wireless technologies and/or legacy telecommunication technologies.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

FIG. 1 shows a general system architecture 100 in which a user 102 is equipped with a communication device 104 (shown both as a smaller device as well as in an enlarged depiction). The device 104 may run one or more application programs (apps) 106 which may be in communication with one or more corresponding servers, such as the example servers 108-111 in FIG. 1.

The applications 106 in general may include, but are not limited to communication applications (e.g., mail app and messaging app, represented by icons 113 and 114, respectively), social apps (e.g., represented by icon 115), shopping apps, productivity apps, or any other of a various number of types of applications (such as, for example a travel app represented by icon 116).

The device 104 also may have software or logic (e.g., in firmware) that serves as a connectivity manager 118. The connectivity manager 118 may be in communication with a connectivity management server 120 (e.g., of a service that includes one or more such servers). As will be understood, in one example implementation, the connectivity manager 118 and connectivity management server 120 provide control as to when connectivity exists between the applications 106 and their corresponding servers 108-111, which can include when the connections are made active, and for how long they are active.

A connectivity management settings data store 122 (e.g., database) coupled to the database connectivity management server 120 may store the settings that define the preferences for connectivity management for the device 104, along with preference settings for many other devices (not explicitly shown). Instead of or in addition to such a data store 122, the preference settings may be stored in the device's storage.

In a default mode, the connectivity settings may be activated for one or more of the types of networks that are available for the device 104, for example, Wi-Fi, cellular, or BLUETOOTH. In this default mode, the apps and communications for each app follow the same rules, namely that connectivity can be either on or off in for any/all running/loaded applications; there is no application-specific control of connectivity, or context-specific or situation-specific management of connectivity or any other conditions that can indicate that only partial connectivity between the device and its one or more servers exists. Such default connectivity settings may be stored in both the device 104 and the connectivity management settings data store 122.

Figure 2:
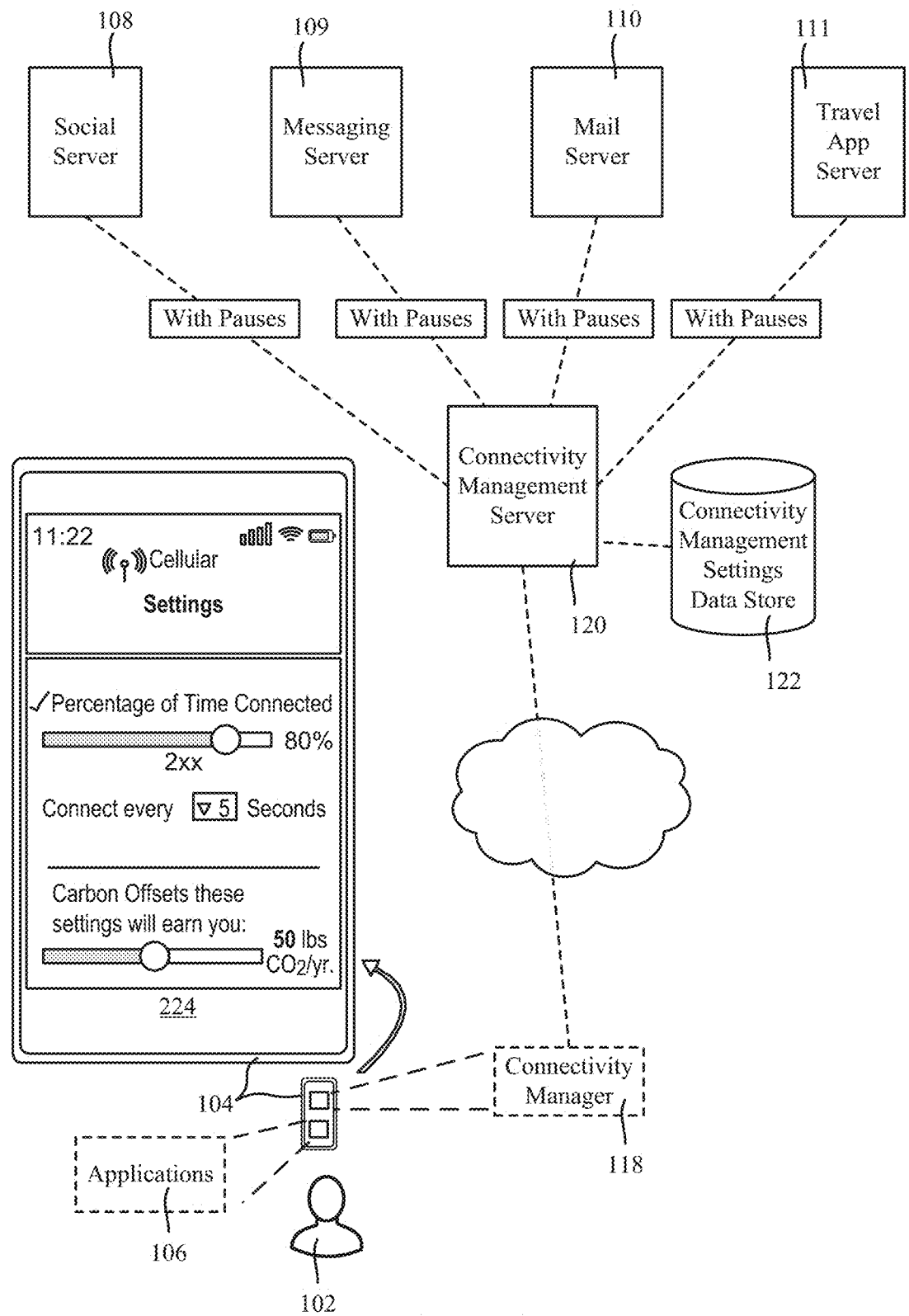
FIG. 2 is an example representation of a system and device with an interactive user interface that facilitates device connectivity pauses, in accordance with various aspects and embodiments of the subject disclosure.

FIG. 2 shows the concept of connectivity pauses, which can change the connected state of the device 104. To this end, in one embodiment the connectivity manager 118 introduces connectivity pauses to temporarily disconnect one or more application's network connectivity from the device 104. Pauses may be for one or more types of network connection (e.g., only cellular) up to all types.

In the example user interface 224 of FIG. 2, connectivity pauses may be instantiated by defining a percentage of time to be connected, and/or how often and for what duration to connect. Note that "pause" as used herein refers to some reduced connectivity state change, which can be a disconnected state, or some throttled state that helps conserve resources. Other ways to implement connectivity pauses are feasible; e.g., connect occasionally to check for content to download, and remain connected to (at least background) download the content if any such content exists, otherwise disconnect until the next checking interval. For example, once a connection is made, the connection may be maintained until each loaded running apps have connected and delivered pertinent data, and then again may be disconnected.

Thus, connectivity pauses may be saved as settings and used by the connectivity manager 118 to determine when to initiate connections and for what duration of time. Pauses may result in resource sustainability savings and cost savings to power companies, network providers, and application providers. The savings realized may be estimated by various other technologies and returned as credits to the user, e.g., carbon offset earnings (as in FIG. 2), reward points that can be applied for merchandise discounts, airline miles, and so forth. Such benefit(s) can be presented to the user, e.g., on the device display, via speech feedback, and/or the like.

Figure 3:
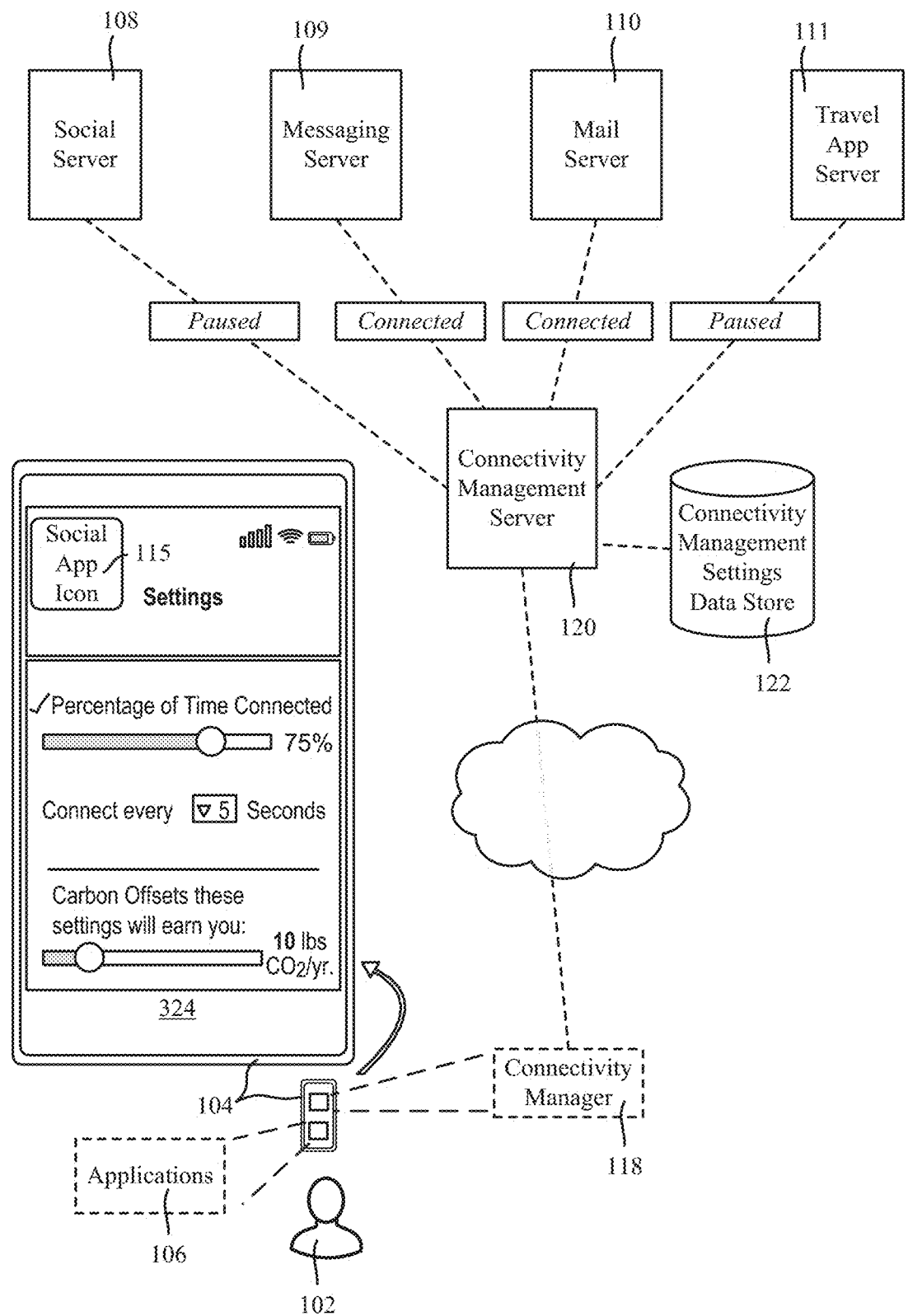
FIG. 3 is an example representation of a system and device with an interactive user interface that facilitates per-application connectivity pauses, in accordance with various aspects and embodiments of the subject disclosure.

Alternatively, as shown in the example user interface 324 of FIG. 3, connectivity pauses may be specified on a per-app basis. For example, the user may wish for their messaging and mail apps to be always connected, however, they may permit a social media app (e.g., represented by the social app icon 115 and the social server 108) and a travel app and its server 111 (separately selected, such as an airline app) to encounter pauses.

Figure 4:
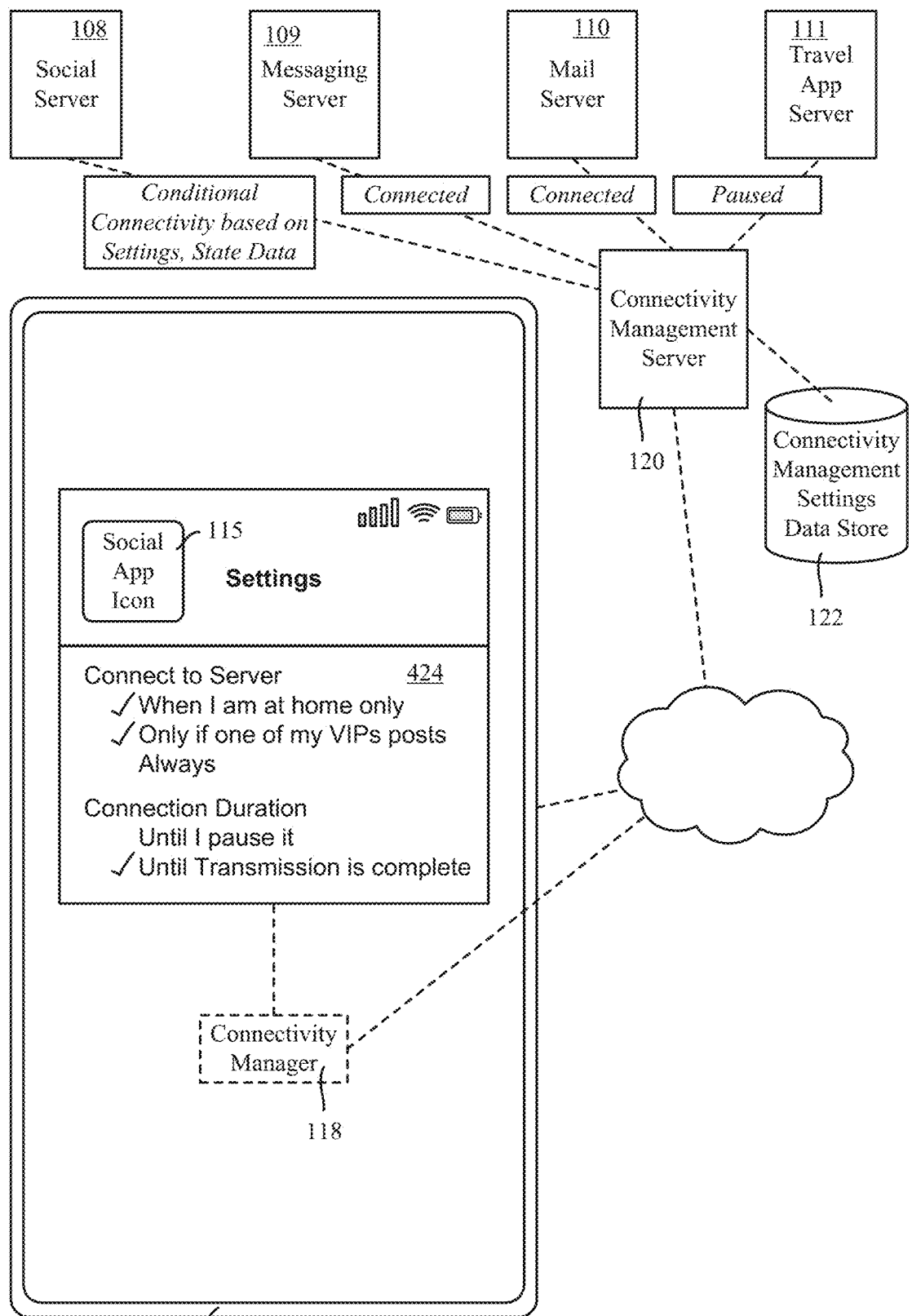
FIG. 4 is an example representation of a system and device with an interactive user interface that facilitates connectivity pauses based on application-specific connectivity settings, in accordance with various aspects and embodiments of the subject disclosure.

In another embodiment generally represented in the example user interface 424 of FIG. 4, the connectivity management settings may be used to specify at a per-application level which apps to connect and under what conditions. In this manner, even if an app is open on the user's device, if the settings indicate that the app should not connect to its server, it does not connect to its companion server and there is no communication between the two. As an example, as shown in FIG. 4 via social app icon 115 and social server, the user may wish to limit when the connection is made for a social media app. In the example of FIG. 4, instead of always connected to the social app server 108, the user has selected to only connect when at home and only if one of his or her VIPs posts content. The selected connection duration is until the transmission is complete (instead of manually paused, for example); as other possible examples, the selected connection duration can be for a fixed time, and/or tied to the connection type, such as 5 minutes if cellular, 20 minutes if Wi-Fi.

To do so, as can be seen in FIG. 4, the user sets the connectivity settings specific to that app. In this example, connectivity is conditional based on the settings and the current state data, e.g., whether the user is at home and if a VIP has posted content. Note that such settings are different from, for example, setting conditions for enabling push notifications from the server to the app; in that case and unlike the technology described herein, although use of push notifications is managed, the connection still exists pervasively. Note further that while connectivity of one set of applications can be paused, other applications may be unaffected and always connected.

In some situations, a connection may be paused by the connectivity manager 118, but the connectivity management server 120 is notified by a server (e.g., the mail server 110) that some content is ready for downloading to the user device. In such a situation, the connectivity management server 120 can manage the connectivity, by evaluating the connectivity preference settings in the connectivity management settings data store 122, and if a connection is appropriate, instructing the connectivity manager 118 to initiate a reconnection from the appropriate device application to the corresponding server. If not already connected, e.g., for a different application, the connectivity management server 120 can initiate the connection to the device's connectivity manager 118.

Figure 5:
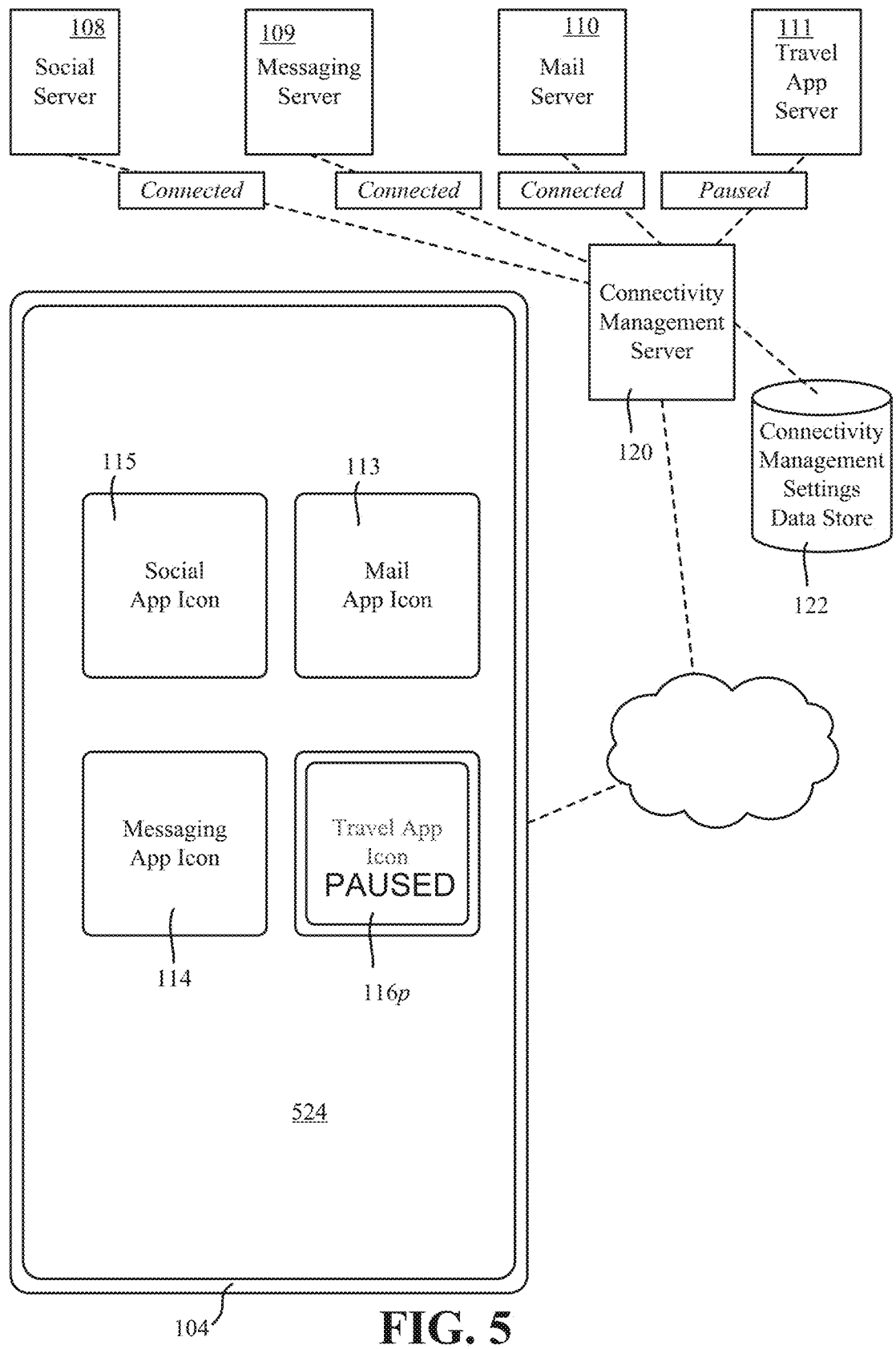
FIG. 5 is an example representation of a device with an interactive user interface that displays connectivity pause state data for a connectivity-pause application program, in accordance with various aspects and embodiments of the subject disclosure.

When connectivity for an app is paused, it may be presented to the user as such via a user interface. For instance, as shown in the user interface 524 of FIG. 5, an icon representing the app on the device may be displayed in such a manner. As a more particular example, in FIG. 5 the connection to the travel app server 111 is paused, and thus the icon 116p representing the travel app is displayed in some suitable way to indicate that the app is paused, (in contrast to the icon 116 in FIG. 1 in the connected state).

In this way, even though the user may have opened the app on the device and not closed it, the connectivity pause may have activated to disconnect the app-to-server connection. In this example, the user may touch the icon 115p to force a re-initiation of a connection between the underlying app and the server 111. Other alternatives for indicating connection state are feasible, e.g., a countdown timer can be used to indicate to the user when reconnection is to occur for a paused connection, the paused indicator can fade out while the application icon fades in, colors (e.g., a green border when connected transitioning to yellow when getting closer in time to pausing, transitioning to red when fully paused, and vice-versa) can be used. A throttled connection can use another or a similar indicator, including for example percent currently throttled or the like, something such as a border ranging from light grey to dark gray depending on current level of throttling, and so forth.

Turning to another aspect, the connectivity manager 118 may monitor the user's use of their apps and/or their device 104 as a whole, and determine trends and common practices and schedules for the user. Such trends and typical schedules may be used to learn and predict which apps will typically need connectivity, including under various condition data (where "condition data" can comprise a single condition or multiple conditions). For example, the user's situation may be detected or inferred based on their location, time of day/day of week, or other sensor-based or data-based analysis by the connectivity manager 118. For instance, if the user is determined to be actively using their business mail app for a threshold period of time, the connectivity manager 118 may initiate connectivity pauses for any gaming apps on the device. Any number of such condition data/current state data may be detected and evaluated to result in pauses being started or stopped.

In another aspect, learning of connectivity needs may be based on the communication and battery needs of the app itself. For example, the connectivity monitor may passively monitor the shape (bursts, constant, rising, declining and volume of each of these connections) and frequency (by minute, daily, after certain activities of the user or the user's device) of connectivity and communications between the application and other network connections. Statistics about the shape and frequency of connectivity needs can then be constructed for each application with the possible statistics partitions partitioned by time (e.g. hour, day of week, etc.) or location (e.g. work, home, etc). Further, the system may compute differences or aggregation measures based on these statistics to predict whether or not the patterns convey useful information changes. Through this computation, the system may infer if the application is simply looking for software updates (constant patterns, fixed interval), updating user content (large bursts of connectivity and data), triggered by events (no temporal pattern, but consistent data pattern), etc. Also, with these statistics the system may construct an "importance" metric for the different types of connectivity that an application needs, which may also be used as conditions for the pausing or resuming of an application.

Figure 6:
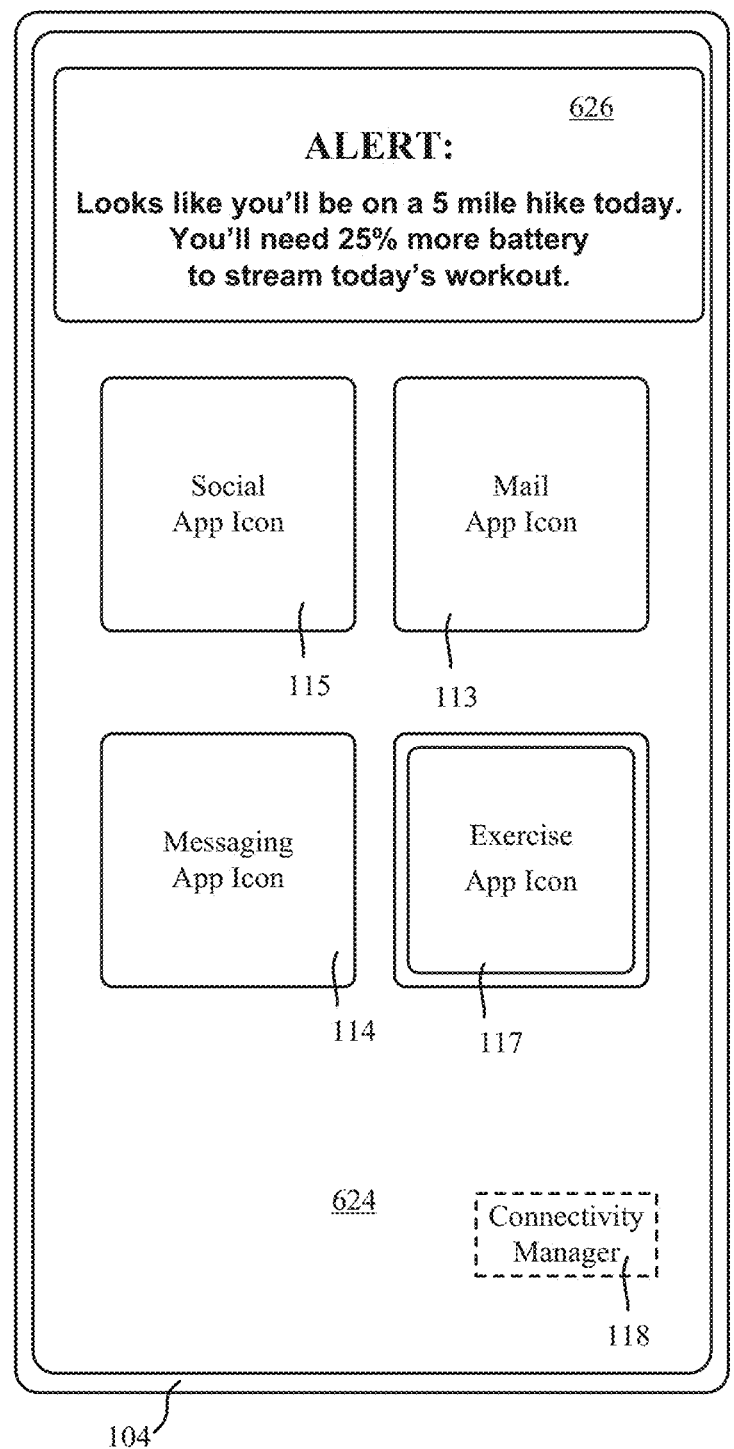
FIG. 6 is an example representation of a device with a user interface that displays an alert based on predicted connectivity needs, in accordance with various aspects and embodiments of the subject disclosure.

By predicting the user's connectivity needs in this matter, the connectivity manager 118 may use the same type of process to project future connectivity needs for the user. In doing so, the connectivity manager may also project the device's future power needs and make recommendations for charging the device, if needed. Thus, by way of example, FIG. 6 shows that an exercise app (represented by the exercise app icon 117 on the user interface 624) has scheduled a five-mile hike (e.g., virtually streamed) for the user to some exercise equipment such as a treadmill. Based on that information and the device's state of battery charge, the connectivity manager 118 has predicted that insufficient battery charge exists to complete the activity. As such, in this example an alert 626 is presented to the user indicating the need to charge the battery. Note that such a prediction can happen when the application is currently closed based on previously known information.

Figure 7:
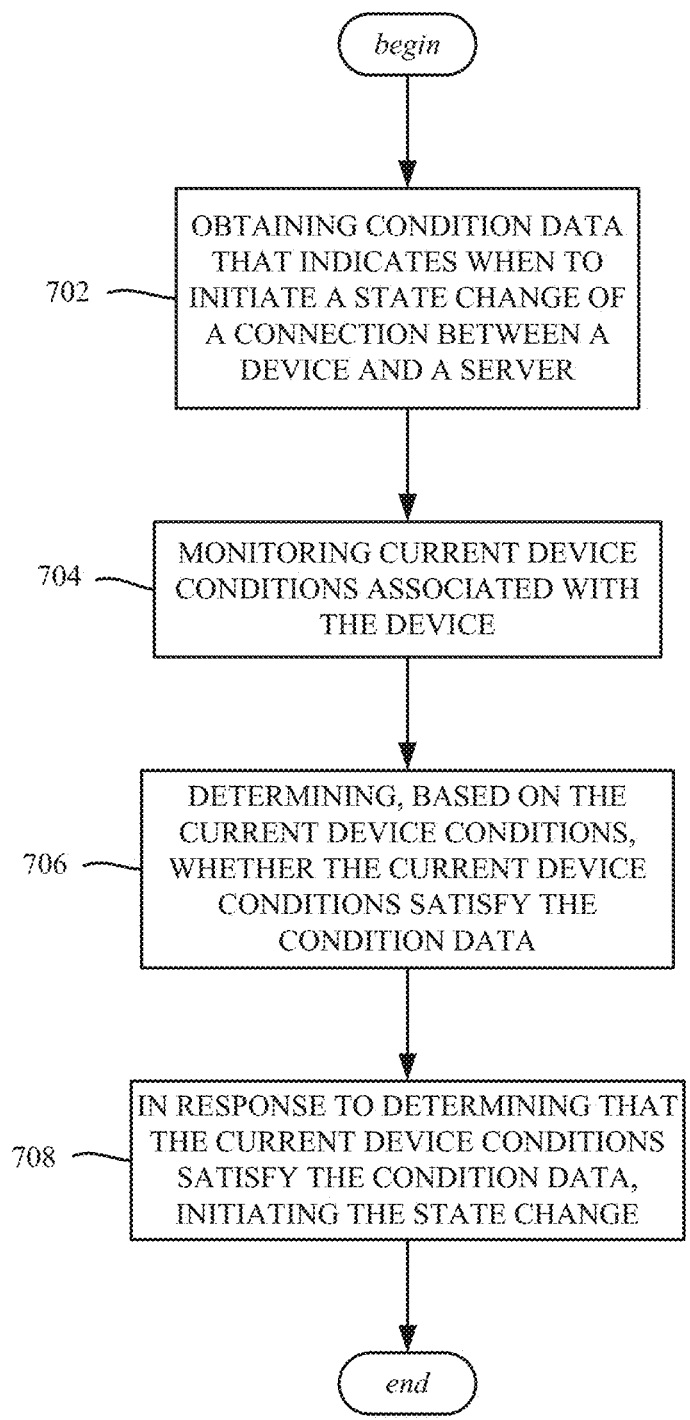
FIG. 7 is a flow diagram representing example operations related to initiating a state change based on monitored conditions, in accordance with various aspects and embodiments of the subject disclosure.

One or more example aspects are represented in FIG. 7, and can correspond to a system, including a processor, and a memory that stores executable instructions that, when executed by the processor, facilitate performance of operations. Example operation 702 represents obtaining condition data that indicates when to initiate a state change of a connection between a device and a server. Example operation 704 represents monitoring current device conditions associated with the device. Example operation 706 represents determining, based on the current device conditions, whether the current device conditions satisfy the condition data. Example operation 708 represents, in response to determining that the current device conditions satisfy the condition data, initiating the state change.

The condition data can include at least one of: percentage data representative of a percentage of time the device is connected, duration data representative of duration of time the device is connected, count data representative of a number of times the device is connected, frequency data representative of how often the device is connected, location data representative of a location of the device, time data representative of a current time value, shape of network traffic, or frequency of network traffic.

The connection between the device and the server can correspond to a first state of connection, the initiating of the state change can change the first state to a second state of connection between the device and the server, and further operations can include obtaining reconnection data that indicates when to restore the state of connection from the second state of connection to the first state of connection, and restoring the state of connection to the first state of connection based on the reconnection data. The reconnection data can include at least one of: a time duration, or a completion of data transfer between the device and the server.

The connection between the device and the server can correspond to a first state of connection, the initiating of the state change can change the first state to a second state of connection between the device and the server, and further operations can include receiving a communication from the server to restore the state of connection from the second state of connection to the first state of connection, and restoring the state of connection to the first state of connection in response to the receiving of the communication.

The condition data can include first condition data associated with a type of network via which the device is capable of communicating, and second condition data associated with a second type of network via which the device is capable of communicating.

The condition data can include first condition data associated with a first application program of the device, and second condition data associated with a second application program of the device.

The connection between the device and the server can correspond to a first state of connection between an application program of the device and the server, the initiating of the state change can change the first state to a second state of connection between the device and the server, and further operations can include modifying a representation of the application program displayed on the device to indicate the second state of connection between the device and the server with respect to the application program. The representation of the application program displayed on the device can be a first representation, and further operations can include detecting interaction with the representation of the application program displayed on the device, and, in response to the detecting, restoring the state of connection from the second state of connection to the first state of connection, and modifying the first representation to a second representation that no longer indicates the second state of connection between the device and the server with respect to the application program.

Initiating the state change can include pausing the connection between the device and the server.

Initiating the state change can include throttling communications over the connection between the device and the server.

Initiating the state change can include completing a communication between the device and the server, and pausing the connection between the device and the server after the completing of the communication.

The condition data can be maintained on at least one of: a storage of the device, or a remote service communicatively coupled to the device.

Further operations can include presenting, via an output device of the device, a representation of a benefit of the initiating of the state change.

Figure 8:
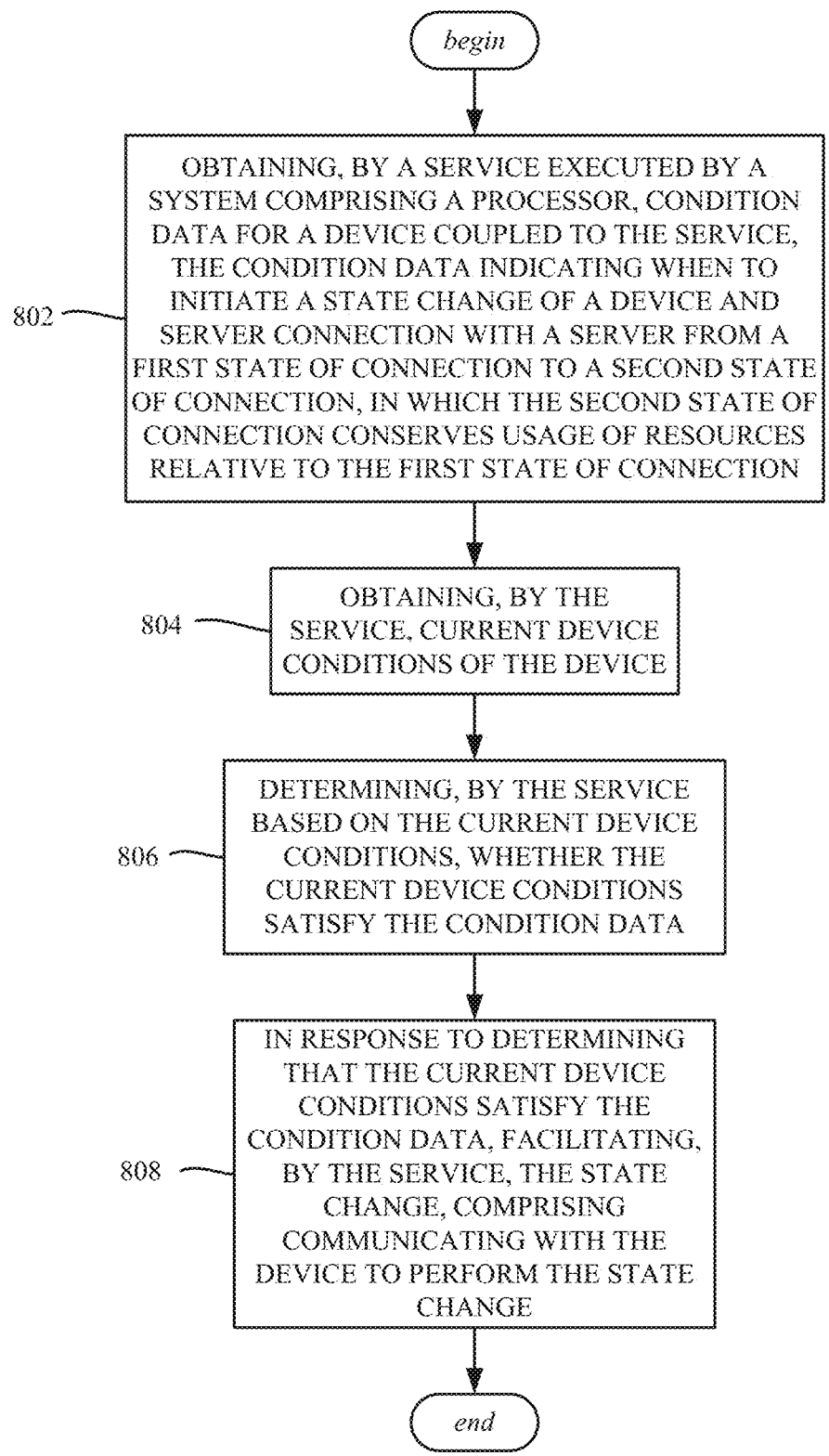
FIG. 8 is a flow diagram representing example operations related to determining, at a service, that a connectivity state change is to be performed, in accordance with various aspects and embodiments of the subject disclosure.

One or more example aspects are represented in FIG. 8, and, for example, can correspond to operations, such as of a method. Example operation 802 represents obtaining, by a service executed by a system comprising a processor, condition data for a device coupled to the service, the condition data indicating when to initiate a state change of a device and server connection with a server from a first state of connection to a second state of connection, in which the second state of connection conserves usage of resources relative to the first state of connection. Example operation 804 represents obtaining, by the service, current device conditions of the device. Example operation 806 represents determining, by the service based on the current device conditions, whether the current device conditions satisfy the condition data. Example operation 808 represents, in response to determining that the current device conditions satisfy the condition data, facilitating, by the service, the state change, comprising communicating with the device to perform the state change.

Further operations can include communicating with the device to restore the state of connection from the second state of connection to the first state of connection.

Further operations can include receiving, by the service from the server, a request to restore the connection between the device and the server, and, in response to the request, communicating with the device to restore the state of connection from the second state of connection to the first state of connection.

Communicating with the device to perform the state change can include instructing the device to pause the connection, and communicating with the device to restore the state of connection can include instructing the device to reinitiate the connection.

Figure 9:
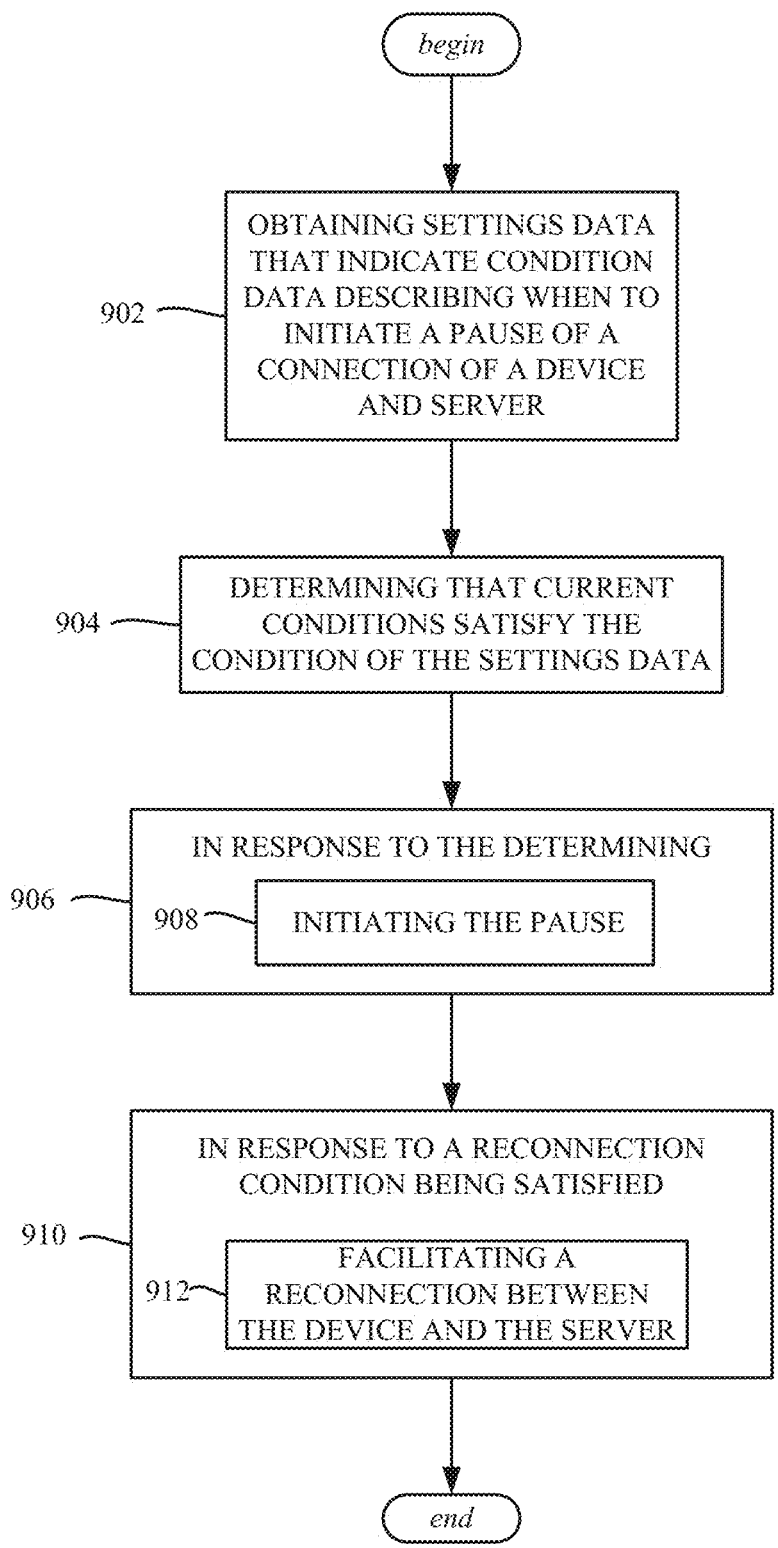
FIG. 9 is a flow diagram representing example operations related to pausing a connection between a server and device and facilitating a reconnection, in accordance with various aspects and embodiments of the subject disclosure.

One or more aspects are represented in FIG. 9, such as implemented in a machine-readable medium, including executable instructions that, when executed by a processor of a device, facilitate performance of operations. Example operation 902 represents obtaining settings data that indicate condition data describing when to initiate a pause of a connection of a device and server. Example operation 904 represents determining that current conditions satisfy the condition of the settings data. Example operation 906 represents, in response to the determining, initiating the pause (operation 908). Example operation 910 represents, in response to a reconnection condition being satisfied, facilitating a reconnection between the device and the server (operation 912).

Further operations can include monitoring operation of the device to obtained learned information, the learned information comprising at least one of: practice data, schedule data or trend data, and determining at least one of: the settings data or the reconnection condition based on the learned information.

As can be seen, the technology described herein facilitates more efficient connectivity management for communication devices, instead of persistent connectivity whenever a communication network is available and the device detects the availability. The technology described herein thus avoids virtually constant connectivity for the user, which is typically wasteful and inefficient during large portions of time when the user is not in the need of connectivity. The technology described herein thus provides a dynamic connectivity management solution that improves efficiency, reduces network, server, and device resource requirements, and saves on overall power demands for various elements of the device and communications system architecture.

Turning to aspects in general, a wireless communication system can employ various cellular systems, technologies, and modulation schemes to facilitate wireless radio communications between devices (e.g., a UE and the network equipment). While example embodiments might be described for 5G new radio (NR) systems, the embodiments can be applicable to any radio access technology (RAT) or multi-RAT system where the UE operates using multiple carriers e.g., LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (including both open-loop and closed-loop), beamforming, and codebook-based precoding can also be used to address issues such as efficiency, interference, and range.

Figure 10:
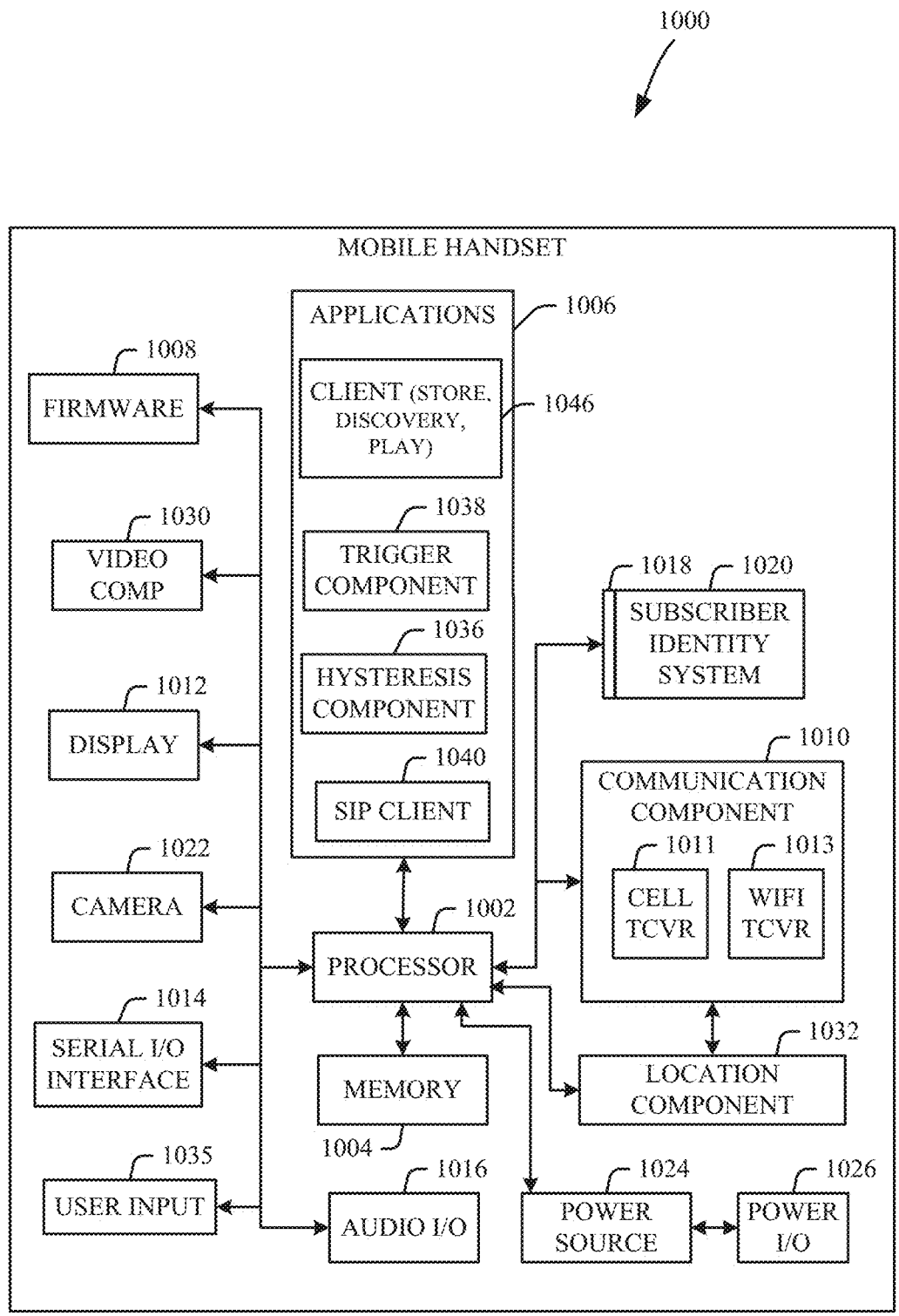
FIG. 10 illustrates an example block diagram of an example mobile handset operable to engage in a system architecture that facilitates wireless communications according to one or more embodiments described herein.

Referring now to FIG. 10, illustrated is a schematic block diagram of an example end-user device (such as user equipment) that can be a mobile device 1000 capable of connecting to a network in accordance with some embodiments described herein. Although a mobile handset 1000 is illustrated herein, it will be understood that other devices can be a mobile device, and that the mobile handset 1000 is merely illustrated to provide context for the embodiments of the various embodiments described herein. The following discussion is intended to provide a brief, general description of an example of a suitable environment 1000 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1000 includes a processor 1002 for controlling and processing all onboard operations and functions. A memory 1004 interfaces to the processor 1002 for storage of data and one or more applications 1006 (e.g., a video player software, user feedback component software, etc.). Other applications can include voice recognition of predetermined voice commands that facilitate initiation of the user feedback signals. The applications 1006 can be stored in the memory 1004 and/or in a firmware 1008, and executed by the processor 1002 from either or both the memory 1004 or/and the firmware 1008. The firmware 1008 can also store startup code for execution in initializing the handset 1000. A communications component 1010 interfaces to the processor 1002 to facilitate wired/wireless communication with external systems, e.g., cellular networks, VoIP networks, and so on. Here, the communications component 1010 can also include a suitable cellular transceiver 1011 (e.g., a GSM transceiver) and/or an unlicensed transceiver 1013 (e.g., Wi-Fi, WiMax) for corresponding signal communications. The handset 1000 can be a device such as a cellular telephone, a PDA with mobile communications capabilities, and messaging-centric devices. The communications component 1010 also facilitates communications reception from terrestrial radio networks (e.g., broadcast), digital satellite radio networks, and Internet-based radio services networks.

The handset 1000 includes a display 1012 for displaying text, images, video, telephony functions (e.g., a Caller ID function), setup functions, and for user input. For example, the display 1012 can also be referred to as a "screen" that can accommodate the presentation of multimedia content (e.g., music metadata, messages, wallpaper, graphics, etc.). The display 1012 can also display videos and can facilitate the generation, editing and sharing of video quotes. A serial I/O interface 1014 is provided in communication with the processor 1002 to facilitate wired and/or wireless serial communications (e.g., USB, and/or IEEE 1094) through a hard-wire connection, and other serial input devices (e.g., a keyboard, keypad, and mouse). This supports updating and troubleshooting the handset 1000, for example. Audio capabilities are provided with an audio I/O component 1016, which can include a speaker for the output of audio signals related to, for example, indication that the user pressed the proper key or key combination to initiate the user feedback signal. The audio I/O component 1016 also facilitates the input of audio signals through a microphone to record data and/or telephony voice data, and for inputting voice signals for telephone conversations.

The handset 1000 can include a slot interface 1018 for accommodating a SIC (Subscriber Identity Component) in the form factor of a card Subscriber Identity Module (SIM) or universal SIM 1020, and interfacing the SIM card 1020 with the processor 1002. However, it is to be appreciated that the SIM card 1020 can be manufactured into the handset 1000, and updated by downloading data and software.

The handset 1000 can process IP data traffic through the communication component 1010 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1022 (e.g., a camera) can be provided for decoding encoded multimedia content. The video processing component 1022 can aid in facilitating the generation, editing and sharing of video quotes. The handset 1000 also includes a power source 1024 in the form of batteries and/or an AC power subsystem, which power source 1024 can interface to an external power system or charging equipment (not shown) by a power I/O component 1026.

The handset 1000 can also include a video component 1030 for processing video content received and, for recording and transmitting video content. For example, the video component 1030 can facilitate the generation, editing and sharing of video quotes. A location tracking component 1032 facilitates geographically locating the handset 1000. As described hereinabove, this can occur when the user initiates the feedback signal automatically or manually. A user input component 1034 facilitates the user initiating the quality feedback signal. The user input component 1034 can also facilitate the generation, editing and sharing of video quotes. The user input component 1034 can include such conventional input device technologies such as a keypad, keyboard, mouse, stylus pen, and/or touch screen, for example.

Referring again to the applications 1006, a hysteresis component 1036 facilitates the analysis and processing of hysteresis data, which is utilized to determine when to associate with the access point. A software trigger component 1038 can be provided that facilitates triggering of the hysteresis component 1038 when the Wi-Fi transceiver 1013 detects the beacon of the access point. A SIP client 1040 enables the handset 1000 to support SIP protocols and register the subscriber with the SIP registrar server. The applications 1006 can also include a client 1042 that provides at least the capability of discovery, play and store of multimedia content, for example, music.

The handset 1000, as indicated above related to the communications component 810, includes an indoor network radio transceiver 1013 (e.g., Wi-Fi transceiver). This function supports the indoor radio link, such as IEEE 802.11, for the dual-mode GSM handset 1000. The handset 1000 can accommodate at least satellite radio services through a handset that can combine wireless voice and digital radio chipsets into a single handheld device.

Figure 11:
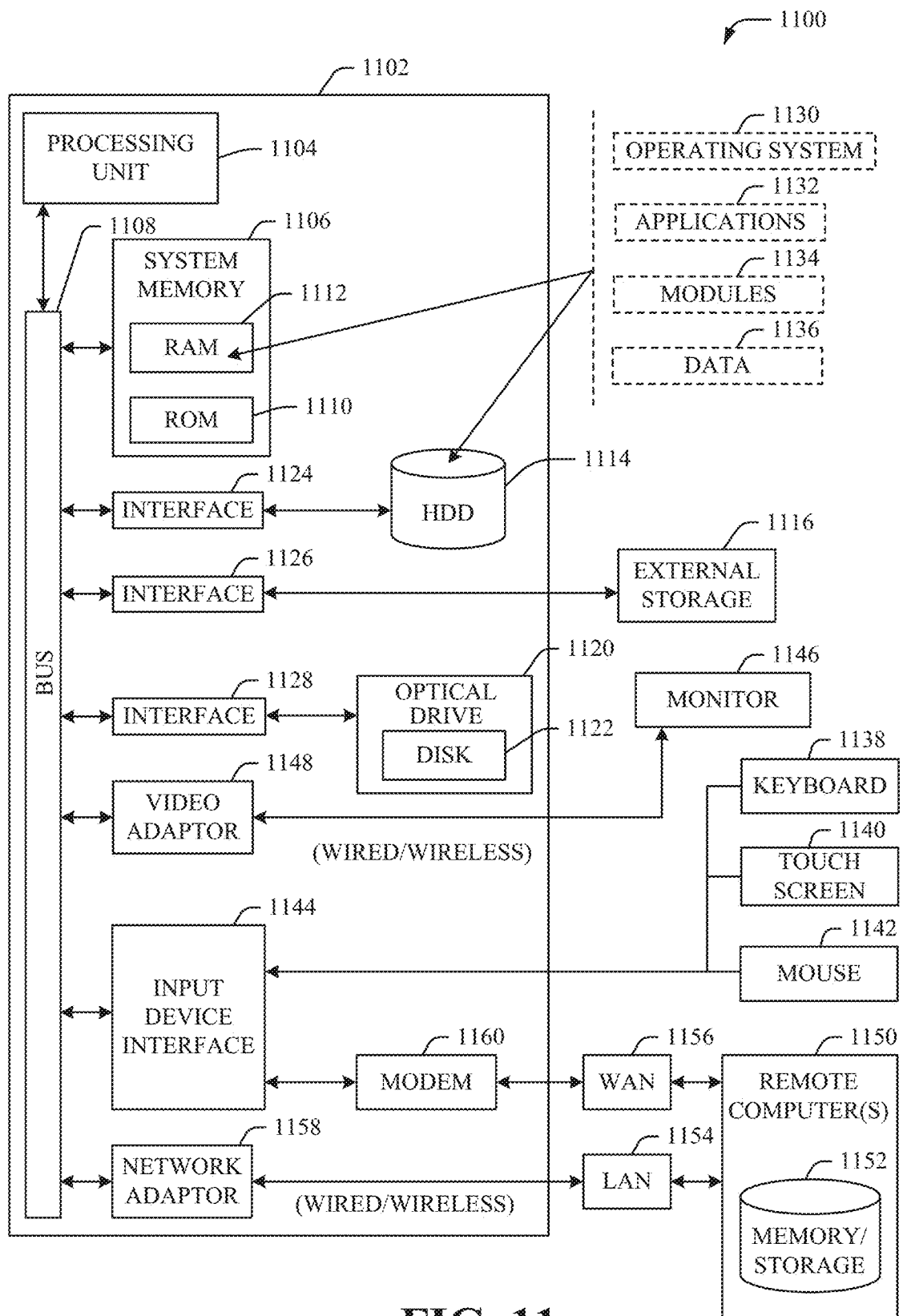
FIG. 11 illustrates an example block diagram of an example computer/machine system operable to engage in a system architecture that facilitates wireless communications according to one or more embodiments described herein.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.).

While the internal HDD 1114 is illustrated as located within the computer 1102, the internal HDD 1114 can also be configured for external use in a suitable chassis (not shown). Additionally, while not shown in environment 1100, a solid state drive (SSD), non-volatile memory and other storage technology could be used in addition to, or in place of, an HDD 1114, and can be internal or external. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1094 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally include emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can include one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, stand-alone, executable packages of software that include, e.g., code, runtime, system tools, system libraries and settings for an application.

Further, computer 1102 can be enabled with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1094 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 11 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," "station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A system, comprising:
a processor; and
a memory that stores executable instructions that, when executed by the processor of the system when deployed in a communication network, facilitate performance of operations, the operations comprising:
obtaining, from a device, condition data that indicates when to initiate a state change of a first connection between the device and a first server associated with a first application program of the device, wherein the first connection between the device and the first server is via the system, wherein the first connection is one of a plurality of connections between the device and a plurality of servers via the system for a plurality of application programs of the device, wherein the condition data comprises at least one connectivity management setting associated with the first application program;
monitoring current device conditions associated with the device;
determining, based on the current device conditions, whether the current device conditions satisfy the condition data; and in response to determining that the current device conditions satisfy the condition data, initiating the state change of the first connection.

2. The system of claim 1, wherein the condition data further comprises at least one of: percentage data representative of a percentage of time the device is connected, duration data representative of duration of time the device is connected, count data representative of a number of times the device is connected, frequency data representative of how often the device is connected, location data representative of a location of the device, time data representative of a current time value, shape of network traffic, or frequency of network traffic.

3. The system of claim 1, wherein the first connection between the device and the first server corresponds to a first state of connection, wherein the initiating of the state changes the first state to a second state of connection between the device and the first server, and wherein the operations further comprise obtaining reconnection data that indicates when to restore the state of connection from the second state of connection to the first state of connection, and restoring the state of connection to the first state of connection based on the reconnection data.

4. The system of claim 3, wherein the reconnection data comprises at least one of: a time duration, or a completion of data transfer between the device and the first server.

5. The system of claim 1, wherein the first connection between the device and the first server corresponds to a first state of connection, wherein the initiating of the state changes the first state to a second state of connection between the device and the first server, and wherein the operations further comprise receiving a communication from the first server to restore the state of connection from the second state of connection to the first state of connection, and restoring the state of connection to the first state of connection in response to the receiving of the communication.

6. The system of claim 1, wherein the condition data further comprises first condition data associated with a type of network via which the device is capable of communicating, and second condition data associated with a second type of network via which the device is capable of communicating.

7. The system of claim 1, wherein the condition data comprises first condition data associated with the first application program of the device, and wherein second condition data is associated with a second application program of the device.

8. The system of claim 1, wherein the first connection between the device and the first server corresponds to a first state of connection between the first application program of the device and the first server, wherein the initiating of the state changes the first state to a second state of connection between the device and the first server, and wherein the operations further comprise:
modifying a representation of the first application program displayed on the device to indicate the second state of connection between the device and the first server with respect to the first application program.

9. The system of claim 8, wherein the representation of the first application program displayed on the device is a first representation, and wherein the operations further comprise:
detecting interaction with the representation of the first application program displayed on the device, and, in response to the detecting, restoring the state of connection from the second state of connection to the first state of connection, and modifying the first representation to a second representation that no longer indicates the second state of connection between the device and the first server with respect to the first application program.

10. The system of claim 1, wherein the initiating of the state change comprises pausing the first connection between the device and the first server.

11. The system of claim 1, wherein the initiating of the state change comprises throttling communications over the first connection between the device and the first server.

12. The system of claim 1, wherein the initiating of the state change comprises completing a communication between the device and the first server, and pausing the first connection between the device and the first server after the completing of the communication.

13. The system of claim 1, wherein the condition data is maintained on at least one of: a storage of the device, or a remote service communicatively coupled to the device.

14. The system of claim 1, wherein the operations further comprise presenting, via an output device of the device, a representation of a benefit of the initiating of the state change.

15. A method, comprising:
obtaining, by a service executed by a system comprising a processor deployed in a communication network from a device, condition data for the device coupled to the service, the condition data indicating when to initiate a state change of a first device and server connection with a first server via the system from a first state of connection to a second state of connection, in which the second state of connection conserves usage of resources relative to the first state of connection, wherein the first server is associated with a first application program of the device, wherein the first device and server connection is one of a plurality of device and server connections between the device and a plurality of servers via the system for a plurality of application programs of the device, wherein the condition data comprises at least one connectivity management setting associated with the first application program;
obtaining, by the service, current device conditions of the device;
determining, by the service based on the current device conditions, whether the current device conditions satisfy the condition data; and
in response to determining that the current device conditions satisfy the condition data, facilitating, by the service, the state change of the first device and server connection, comprising communicating with the device to perform the state change.

16. The method of claim 15, further comprising communicating with the device to restore the state of connection from the second state of connection to the first state of connection.

17. The method of claim 15, further comprising receiving, by the service from the first server, a request to restore the first device and server connection between the device and the first server, and, in response to the request, communicating with the device to restore the state of connection from the second state of connection to the first state of connection.

18. The method of claim 15, wherein the communicating with the device to perform the state change comprises instructing the device to pause the first device and server connection, and wherein the communicating with the device to restore the state of connection comprises instructing the device to reinitiate the first device and server connection.

19. A non-transitory machine-readable medium, comprising executable instructions that, when executed by a processor of a device, facilitate performance of operations, the operations comprising:

obtaining settings data that indicate condition data describing when to initiate a pause of a first connection between the device and a first server via a system deployed in a communication network, wherein the first server is associated with a first application program of the device, wherein the first connection is one of a plurality of connections between the device and a plurality of servers via the system for a plurality of application programs of the device, wherein the condition data comprises at least one connectivity management setting associated with the first application program;

determining that current conditions satisfy the condition of the settings data;

in response to the determining, initiating the pause, wherein the initiating of the pause comprises a communication to the system, and in response to a reconnection condition being satisfied, facilitating a reconnection between the device and the first server via the system.

20. The non-transitory machine-readable medium of claim 19, wherein the operations further comprise:

monitoring operation of the device to obtain learned information, the learned information comprising at least one of: practice data, schedule data or trend data; and determining at least one of: the settings data or the reconnection condition based on the learned information.

* * * * *